United States Patent [19]
Yonemura et al.

[11] Patent Number: 6,166,097
[45] Date of Patent: Dec. 26, 2000

[54] METHOD FOR PRODUCTION OF POROUS MATERIAL

[75] Inventors: Koichi Yonemura; Hirotama Fujimaru, both of Suita; Naoko Ikushima, Sen-nan; Kazutomo Takahashi, Moriyama, all of Japan

[73] Assignee: Nippon Shokubai Co., Ltd., Osaka, Japan

[21] Appl. No.: 09/548,934

[22] Filed: Apr. 13, 2000

[30] Foreign Application Priority Data

Apr. 14, 1999 [JP] Japan .................................. 11-107295
Apr. 14, 1999 [JP] Japan .................................. 11-107296
Mar. 16, 2000 [JP] Japan .................................. 12-73788

[51] Int. Cl.$^7$ .................................. C08J 9/28; C08J 9/36
[52] U.S. Cl. .................................................. 521/64
[58] Field of Search .................................. 521/64

[56] References Cited

U.S. PATENT DOCUMENTS

| | | | |
|---|---|---|---|
| 5,334,621 | 8/1994 | Beshouri | 521/64 |
| 5,650,222 | 7/1997 | Des Marais et al. | 521/64 |
| 5,652,194 | 7/1997 | Dyer et al. | 521/64 |

FOREIGN PATENT DOCUMENTS

96/40823  12/1996  WIPO .................................. C08J 9/28

*Primary Examiner*—Morton Foelak
*Attorney, Agent, or Firm*—Fish & Richardson P.C.

[57] ABSTRACT

A method for producing a porous material by forming a water-in-oil type high internal phase emulsion, which method is characterized by causing waste water generated during the process of production to be put to reuse. The waste water is preferred to be reused after the removal of impurities or the adjustment of pH. According to this invention, the waste water can be reused up to 50 repetitions, with the result that the amount of feed water and the amount of waste water will be decreased. Incidentally, by adjusting the pH of the water-in-oil type high internal phase emulsion after the reaction thereof in the range of 4–9, it is made possible to continue the reuse of waste water and, at the same time, lower the stimulating property of the produced porous material.

27 Claims, No Drawings

METHOD FOR PRODUCTION OF POROUS MATERIAL

BACKGROUND OF THE INVENTION

1. Field of the Invention

This invention relates to a method for the production of a porous material attained by the formation of a water-in-oil type high internal phase emulsion and characterized by causing the waste water used in forming the water phase in the formation of the water-in-oil type high internal phase emulsion to be reused at any of the steps of process of the production.

2. Description of Related Art

For the production of a porous material consisting of uniform open cells of a minute diameter, a method which make a polymer form in a water-in-oil type high internal phase emulsion in the presence of a specific surfactant is available. The term "high internal phase emulsion" as used herein is generally construed as referring to an emulsion such in constitution that the ratio of an internal phase to the whole volume of the emulsion exceeds 70 vol. % (K. J. Lissant, Journal of Colloid and Interface Science, Vol. 22, p. 462 (1966)). U.S. Pat. No. 5,334,621, for example, discloses a method for producing a porous material in accordance with the water-in-oil type high internal phase emulsion method in which polymerizable monomers contained in such a water-in-oil type high internal phase emulsion are cross-link-polymerized in the emulsion (hereinafter referred to simply as HIPE method).

The HIPE method produces a porous material by preparing a water-in-oil type emulsion comprising (i) a polymerizable monomer mixture containing an oil-soluble vinyl monomer and cross-linking monomer having not less than two functional groups in the molecule, (ii) a water phase of such a quantity as to occupy 90 wt. %, preferably 95 wt. %, and particularly preferably 97 wt. %, of the emulsion, (iii) a surfactant such as a sorbitan fatty acid ester and a glycerol monofatty acid ester, and (iv) a polymerization initiator and heating the water-in-oil type emulsion thereby inducing polymerization and cross-linkage thereof. By this HIPE method, a porous material containing open cells after the fashion of a network is formed in consequence of reversed-phase emulsion polymerization. The porous material to be obtained by the HIPE method, therefore, acquires low density and such characteristic properties as ability to absorb water, ability to retain absorbed water, ability to provide heat insulation, and ability to abate noise.

A porous material of low density, namely high porosity, proves to be useful for applications enumerated hereinbelow and nevertheless manifests inferior efficiency in terms of transportation and storage because of high bulkiness. For the purpose of eliminating this drawback, International Publication No. 96/40,823, for example, discloses a method for producing a compressed porous sheet having a thickness of one in several parts of the heretofore usual thickness by polymerizing a porous cross-linked polymer in accordance with the HIPE method. This compressed porous sheet has the nature of retaining the compressed state and, on exposure to a large amount of liquid, quickly absorbing the liquid and restoring the original thickness.

The porous material according to the HIPE method utilized in this manner, however, leaves the formation of pores therein to be affected by the ratio of the water phase as an internal phase to the oil phase as an external phase, i.e. W/O, during the reversed-phase emulsion polymerization in the process of production thereof. An effort to obtain this porous material with as large a pore volume ratio as permissible inevitably results in heightening the proportion of the water phase side of the ratio of W/O. The porous materials of this class enjoy a huge demand. The reason for this popular acceptance is that since the porous materials having large pore volume ratios excel in ability to provide heat insulation and ability to abate noise besides the ability of absorption, they can be used in various fields covering building materials, audio products, and gardening articles. In producing a porous material by the HIPE method, therefore, it is stated in U.S. Pat. No. 5,334,621, for example, that it is particularly commendable to set the pore volume ratio at 97 wt. % (W/O=33.1). Generally, the practice of setting W/O in the range of 30/1–100/1 is frequently adopted. Specifically, an effort to produce a porous material according to the HIPE method entails consumption of a large amount of water for the formation of a water-in-oil type high internal phase emulsion. This fact implies that the production of the porous material by the HIPE method entails the necessity of dehydrating and drying the porous material at the end of the production because the material has contained water during the course of production and, therefore, ends up in generating waste water in a large quantity.

Moreover, the HIPE method generally uses a monovalent—trivalent inorganic salt of an alkali metal for the purpose of incorporating the salt capable of producing a salting out action into the water phase thereby allowing emulsification to proceed smoothly and, at the same time, enabling the produced water-in-oil type high internal phase emulsion to be improved in stability. The waste water obtained by dehydrating the porous cross-linked mass resulting from a polymerization reaction and a cross-linking reaction and the waste water remaining after the washing of the porous material, therefore, copiously contain salts and various kinds of impurities such as unaltered polymerization initiator and decomposed polymerization initiator and show changes in pH. In other words, since the HIPE method produces the porous material via a process for the preparation of a water-in-oil type high internal phase emulsion, the supply of water in a large quantity causes a serious problem and, at the same time, the disposal of a large quantity of waste water containing used salts poses an enormous problem. The waste water, when discarded in its unaltered state, exerts an extremely large load on environment, whereas the waste water, when so treated in advance as to eliminate completely the load on environment, calls for enormous expense and labor.

The porous material mentioned above can be used as sound insulating material and heat insulating material for absorbing sound and heat and as chemical impregnating substrate for impregnating perfume and detergent and further as absorbent for oil and organic solvent. When it is used as a sanitary material such as a disposable diaper or a sanitary article or as a cosmetic article or a medical supply which by nature is destined to contact directly the human body, the porous material in such a finished product is required to possess a surface adapted to minimize the stimulation exerted on the skin so as to prevent the user from suffering eruption of the skin and experiencing unpleasant feeling.

The surface of the porous material which is obtained by polymerizing a water-in-oil type emulsion produced by the conventional method, however, possibly manifests such a low pH as 2–3. The conceivable cause for this low pH value may be that the product of decomposition of the polymerization initiator included in the raw material and the hydrolyzate of the polymerizable monomer are suffered to survive as deposited on the produced porous material. Thus, the method which resides in rinsing with water the porous cross-linked polymer obtained by polymerizing a water-in-oil type emulsion thereby removing simulative substances including acidic substances has heretofore been adopted. This method, however, brings such unfavorable results as increasing the cost of production and exalting the load on environment because it requires to use the rinsing water in an amount several tens times, occasionally some hundreds times, it requires to perform the work of treating and discharging the waste water occurring in a large amount.

In contrast, simply decreasing the amount of water to be used is no easy thing. For, the proportion, wt. %, of the water phase in the water-in-oil type high internal phase emulsion cannot be decreased because the mechanical properties and the ability of absorption of the porous material are governed by the aforementioned ratio of W/O. Since the porous material is used as the core member for a sanitary material and as the material for treating waste oil and as the heat insulator and the sound insulator, it is preferred to possess minute pores in the texture thereof for the purpose of securing characteristic properties fully satisfactory for the purposes of such applications. When the proportion of the water phase is so low as mentioned above, the porous material comprising fine open cells is not obtained and the porous material produced at all suffers the mechanical properties to be deteriorated and the absorption characteristics to be degraded. In the circumstance, the desirability of developing a process which generates waste water in a decreased amount or generates no waste water, affects the environment tenderly, and promises a decrease in the cost of disposal of waste water has been desired.

SUMMARY OF THE INVENTION

The present inventors, after studying the process for the production of a porous material according to the HIPE method, have found that the waste water generating from this process can be reused in the system of production after it has been given a specific treatment. This invention has been perfected as a result. To be specific, this invention has the object of providing the following Items (1) and (2).

(1) A method for the production of a porous material by the formation of a water-in-oil type high internal phase emulsion, characterized by causing waste water generated during the process of production to be reused at any of the steps of said process.

(2) A method for the production of a porous material, comprising the first step through the third step described below and causing at least part of the waste water obtained at said third step to be reused:

First step: For forming a water-in-oil type high internal phase emulsion having as essential components thereof a monomer component consisting of a polymerizable monomer having one polymerizable unsaturated group in the molecular unit thereof and a cross-linking monomer having at least two polymerizable unsaturated groups in the molecular unit, a surfactant, a polymerization initiator, and water, Second step: For polymerizing said monomer component contained in said water-in-oil type high internal phase emulsion thereby forming a porous cross-linked polymer, and Third step: For compressing or dehydrating said porous cross-linked polymer thereby obtaining waste water and a porous material.

DESCRIPTION OF PREFERRED EMBODIMENT (1) Process for use of Waste Water

This invention concerns a method for the production of a porous material effected by the formation of a water-in-oil type high internal phase emulsion and characterized by putting the waste water obtained during the process of the production to reuse somewhere in the process of production. When a water-in-oil type high internal phase emulsion is formed and polymerized into a porous cross-linked polymer, a porous material containing open cells at a low density is obtained. This porous material excels in ability of absorption and mechanical properties. This production of the porous material entails copious use of feed water as described above. By reusing the waste water as the feed water for the production, therefore, the reduction in quantity of the feed water and the reduction in quantity of the waste water can be simultaneously attained.

The waste water does not need to be particularly discriminated in view of the origin, i.e. the specific point in the process of production. As concrete examples of the waste water, the water which has been used for forming the water phase of the water-in-oil type high internal phase emulsion and the water which are generated while the porous material is dried may be cited. This waste water can be put to reuse anywhere in the process of production. It may be used, therefore, for the purpose of forming the water phase of the water-in-oil type high internal phase emulsion, washing the porous material, or washing a necessary item of the apparatus used for the production. In any event, by reusing the waste water, it is made possible to reduce the quantity of the feed water and the quantity of the waste water.

The water-in-oil type high internal phase emulsion to be formed by this invention does not need to be particularly discriminated in view of the ratio of water phase/oil phase (W/O) but may properly select this ratio to suit the purpose for which the porous material is intended. Since the porosity is determined by the W/O ratio, this ratio is properly not less than 3/1 and is preferably in the range of 10/1–250/1 and more preferably in the range of 10/1–100/1. So long as the W/O ratio falls in the range mentioned above, a porous material is suitably usable as various kinds of absorbent materials such as disposable diapers and sanitary materials.

Specifically for obtaining a porous material after forming such a water-in-oil type high internal phase emulsion as mentioned above, the production generally passes through the following steps.

First step: This step resides in producing a water-in-oil type high internal phase emulsion which is composed of a monomer component consisting of a polymerizable monomer having one polymerizable unsaturated group in the molecule and a cross-linking monomer having at least two polymerizable unsaturated groups in the molecule, a surfactant, and water as essential components, Second step: This step resides in producing a porous cross-linked polymer by polymerizing the monomer component contained in the water-in-oil type high internal phase emulsion, Third step: This step resides in compressing or dehydrating the porous cross-linked polymer thereby producing waste water and a porous material, and Fourth step: This step resides in washing the porous material and thereafter compressing or dehydrating the washed porous material thereby obtaining waste water, and further Fifth step: This step resides in optionally subjecting the porous material resulting from the dehydration to at least one step of the process of treatment which comprises the steps of wetting, drying, cutting, and impregnating with a chemical agent.

Though this invention can reuse the waste water which is generated at any of the steps of the process mentioned above, it operates efficiently in reusing the waste water generated at the third or the fourth step in consideration of the amount of the waste water to be discharged. While the question as to which of the steps is to be selected for reusing the waste water is irrelevant, it is preferable to reuse the waste water for the formation of the water phase in the water-in-oil type high internal phase emulsion at the first step which is required to secure service water in the largest quantity or as the rinsing water at the fourth step. In this case, it is permissible to put the waste water obtained at the third step to use at the first step or at the fourth step or to put the waste water obtained at the fourth step to use at the first step or at the fourth step.

(2) Method for Treating Waste Water

The waste water generally contains the various raw materials used at the first step and the second step, the derivatives of the raw materials, and the component in the rinsing water used at the fourth step. The waste water, therefore, may be used in its untreated form for the production of a porous material. When it is continually put to reuse, the impurities gradually grow in concentration and the number of cycles of reuse decreases. When the waste water is to be reused at the first step mentioned above, therefore, it is particularly preferred to pass through a step of treatment capable of stably forming a water-in-oil type high internal phase emulsion or a step of treatment resorting to adjustment of the waste water in pH and removal of impurities from the waste water. The step of treatment enables the ratio of reuse of the waste water to be improved most efficiently.

Specifically, the porous cross-linked polymer which is destined to form the porous material is obtained by subjecting a water-in-oil type high internal phase emulsion formed by suitable stirring to standing polymerization and the stability of the water-in-oil type high internal phase emulsion brings about a large effect on the description of the porous material. The waste water is acidified by the product of decomposition contained in the water-in-oil type high internal phase emulsion and the water-in-oil type high internal phase emulsion suffers the stability thereof harmed owing to the presence of such impurities as salts formed in the process of polymerization. A study performed in search of a method for the treatment of waste water which is capable of most conveniently stabilizing the water-in-oil type high internal phase emulsion has brought a discovery that the waste water, when put to reuse subsequent to removal of impurities and adjustment of pH, can be reused in more than some tens of cycles.

(a) Removal of Impurities

The impurities, i.e. components not called for in the production of a porous material by the HIPE method, comprise water-soluble components and water-insoluble components which are contained in the waste water. The water-soluble components include the products of decomposition of a polymerization inhibitor such as sulfate ion and sulfite ion. Then, the water-insoluble components include the water-insoluble salts of the ions mentioned above, the refuse of a water-in-oil type high internal phase emulsion polymer, rust, dust, etc.

As respects a method for removing the impurities, the waste water containing such mischievous components is treated with ion-exchange resin, semipermeable membrane, or hollow fiber membrane, passed through filter paper, filter cloth, or ultrafiltration membrane, centrifuged, or distilled to eliminate impurities and obtain refined waste water. This invention, besides using these methods singly, may adopt two or more of these methods in combination to effect simultaneous removal of the water-soluble components and the water-insoluble components. Though the substances which harm the stability of the water-in-oil type high internal phase emulsion comprise water-soluble components and water-insoluble components as mentioned above, particularly the water-insoluble components manifest a large effect in the harm. The removal thereof effectively improve the stability. It has been found that among such methods as filtration, centrifugation, and distillation which are available for the removal of the water-insoluble components, the method of centrifugation effects the removal efficiently and particularly the continuous operation of a centrifugal separator accomplishes the removal most efficiently.

Any of the known centrifugal separators may be adopted for effecting the centrifugation aimed at. A continuous decanter type centrifugal separator, a continuous tubular type ultracentrifugal separator, and a continuous delval type disc machine centrifugal separator are used advantageously because they are capable of continuously removing water-insoluble components. A continuous decanter type centrifugal separator proves particularly advantageous because it fits treatment of waste water in a large quantity. By this treatment for the removal of impurities, it is made possible to stabilize the water-in-oil type high internal phase emulsion and produce a porous material excelling in surface conditions. The degree of the removal of impurities is only required to be such that the impurities are removed from the water-in-oil type high internal phase emulsion without inducing any harm to the stability of the emulsion.

(b) Adjustment of pH

The method for adjusting the pH of the waste water for the sake of reuse does not need to be particularly discriminated on the condition that the pH of the waste water has been adjusted by a certain method prior to the cross-linking polymerization performed during the formation of the water-in-oil type high internal path emulsion. For example, the waste water has the pH thereof adjusted to not less than 7, preferably in the range of 9–12, by the addition thereto of a basic component and the waste water is then used for the formation of the emulsion. Otherwise, the emulsion in the process of formation has the pH thereof adjusted to the level mentioned above by the addition of a pH adjusting agent. Incidentally, since the water-in-oil type high internal phase emulsion has the pH thereof after polymerization varied by the kind of the polymerization initiator or the emulsifier to be incorporated in the emulsion, it is commendable to carry out an experiment in advance on the polymerization and determine the quantity of the basic component to be required for setting the pH after polymerization at an expected level.

Since the waste water is disposed to contain sulfate ion and sulfite ion emitted from a persulfate which is the polymerization initiator and unaltered reactant substances of the polymerization initiator, there are cases that it manifests acidity possibly so high as to disable stable retention of the water-in-oil type high internal phase emulsion. The pH, therefore, is adjusted for the purpose of ensuring stable retention of the water-in-oil type high internal phase emulsion and exalting the ratio of reuse of the waste water.

The practice of putting the waste water to reuse after the pH thereof has been adjusted to the neutral or weakly alkaline side as mentioned above proves particularly excellent in the sense that it lowers the stimulation of the produced porous material. The porous material containing an acidic substance gives stimulation to the human body. By using the waste water adjusted in advance to weak alkalinity, it is made possible to produce a porous material which gives only low stimulation to the human body. The surface pH of the porous cross-linked polymer which is obtained by polymerizing the water-in-oil type high internal emulsion falls in the acidic region frequently, though it is variable with the kinds of raw materials to be used. The acidity of the surface pH agrees with the fact that the pH of the waste water resulting from dehydrating the porous cross-linked polymer is less than 5. The waste water on weakly alkaline side, therefore, is adopted for reuse for the purpose of eliminating the influence of the peroxide used as a polymerization initiator and the product of decomposition of a reducing agent.

Specifically, as the method for effecting this adjustment of pH, it is proper to keep the pH of the water reused for the formation of the water-in-oil type high internal phase emulsion at or above 7 or to add in advance to the water a buffer solution capable of keeping the pH of the water phase in the neighborhood of neutrality. Particularly, the method which resides in adding a base to the waste water and adjusting the pH thereof in the range of 9 to 12 proves preferable by reason of convenience.

As concrete examples of the base which fits the addition mentioned above, hydroxides of alkali metals or alkaline earth metal as sodium hydroxide, potassium hydroxide, and calcium hydroxide, organic bases such as triethyl amine, ethanol amine, diethanol amine, triethanol amine, and dimethylamino ethanol, and ammonia may be cited. For this invention, these bases may be used either singly or in the form of a combination of two or more members.

The buffer solution to be used herein may be any of the buffer solutions well known to the art. As concrete examples of the buffer solution which is effectively used herein, salts of phosphoric acid, boric acid, carbonic acid, acetic acid, etc., mixtures of such acids or relevant bases, and well-known buffer solutions such in composition as to permit retention of the pH of the water phase in the neighborhood of neutrality may be cited. The adjustment of pH may be performed prior to reuse. Alternatively, the pH may be suitably adjusted in preparation for the formation of the water-in-oil type high internal phase emulsion.

(c) Temperature of Waste Water

In the production of the porous material by the method of this invention, the temperature of the reaction system prior to the formation of the water-in-oil type high internal phase emulsion is in the range from the normal room temperature to 100° C. as will be specified herein below. Particularly, the waste water possesses a temperature approximating closely to the polymerization temperature because it is obtained by dehydrating or compressing the water-in-oil type high internal phase emulsion immediately after the emulsion has been polymerized. When the waste water thus obtained is enabled by some method to retain such a temperature as mentioned above, this method ought to be advantageous from the economic point of view.

Specifically, the waste water prior to use is preferred to keep the temperature thereof in the range of 25–100° C., more properly in the range of 30–95° C. Besides, it is preferable that a differences of the waste water in temperature between at the time of obtaining from the process for the production of porous materials and at the time of reusing at any of the steps of said process is as low as possible because of economizing on heat energy. This differences of the waste water in temperature is preferably not more than 20° C., more preferably 10° C. This temperature retention promotes economy in the sense of obviating the necessity for heating the reaction system to the temperature proper for the formation of the water-in-oil type high internal phase emulsion and consequently decreasing the energy for heating. In contrast, when fresh water is adopted for the formation of the emulsion, it ought to be heated to some tens of degrees prior to use. The practice of keeping the waste water warm and recycling it as warmed not only economizes water but also saves energy.

The method for keeping the waste water warm as mentioned above does not need to be particularly discriminated. When the temperature of the waste water at the end of the removal of impurities or the adjustment of pH is in the range mentioned above, this waste water may be directly put to use without entailing any problem. When the waste water is suffered to cool and cannot be retained at the temperature mentioned above, it may be adapted for reuse in the formation of the water-in-oil type high internal phase emulsion by insulating the waste water line at the site of treatment and along the path extending to the site of reuse as with a jacket. In this case, the waste water may be heated when necessary.

(3) Mode of Reuse

In putting the waste water to reuse in this invention, the question whether the waste water is utilized wholly or partly for the reuse and the question whether the waste water entails a special treatment or not are irrelevant. Thus, a free choice is allowed among (i) a mode which comprises putting the waste water discharged during the production of a porous material wholly to reuse and discarding the waste water when the formation of a water-in-oil type high internal phase emulsion is substantially difficult, (ii) a mode which comprises putting the waste water discharged during the production of a porous material wholly to reuse in the first step and/or the fourth step in a predetermined number of cycles and thereafter discarding the waste water, and (iii) a mode which comprises putting the waste water partly to reuse and discarding the remainder of the waste water. When the waste water is used continually as the feed water for the production of a porous material in a fixed quantity, it eventually grows insufficient in quantity. In any of the modes (i)–(iii) mentioned above, therefore, the continual reuse of the waste water may be carried out while replenishing the reaction system with fresh water when the water supply runs short during the step of production or washing of the porous material.

The choice among the modes (i)–(iii) mentioned above can be determined by taking into account the environmental criteria of the cite of construction of a plant, the cost of discharging and treatment, the question as to whether or not the water-in-oil type high internal phase emulsion is stable in spite of the use of the waste water after the first step, and the question as to whether or not the waste water to be used impairs the polymerization at the second step or the quality of the product. It is commendable to recycle completely the waste water wholly and avoid discarding the waste water in the light of the fact that the water to be used for the water-in-oil type high internal phase emulsion is in a huge quantity and in consideration of the importance of the protection of the environment.

(4) HIPE Method (a) Polymerizable Monomer Having one Polymerizable Unsaturated Group in Molecule The polymerizable monomer to be used in this invention is a polymerizable monomer which contains one polymerizable unsaturated group in the molecular unit thereof. It does not need to be particularly discriminated but is only required to be capable of inducing dispersion or forming cells in the water-in-oil type high internal phase emulsion. This invention contemplates enhancing the efficiency of production by reusing the water phase according to the HIPE method.

As concrete examples of the polymerizable monomer which is used effectively in this invention, allylene monomers such as styrene; monoalkylene allylene monomers such as ethyl styrene, α-methyl styrene, vinyl toluene, and vinyl ethyl benzene; (meth)acrylic esters such as methyl (meth)acrylate, ethyl (meth)acrylate, butyl (meth)acrylate, isobutyl (meth)acrylate, isodecyl (meth)acrylate, 2-ethylhexyl (meth)acrylate, lauryl (meth)acrylate, stearyl (meth)acrylate, cyclohexyl (meth)acrylate, and benzyl (meth)acrylate; chlorine-containing monomers such as vinyl chloride, vinylidene chloride, and chloromethyl styrene; acrylonitrile compounds such as acrylonitrile and methacrylonitrile; and vinyl acetate, vinyl propionate, N-octadecyl acrylamide, ethylene, propylene, and butene may be cited. These polymerizable monomers may be used either singly or in the form of a combination of two or more members.

Properly, this polymerizable monomer accounts for a proportion in the range of 10–90 wt. %, preferably 30–70 wt. %, to the monomer component. When the proportion is in this range, the porous material to be produced forms cells of a minute diameter.

(b) Cross-linking Monomer Having at Least Two Polymerizable Unsaturated Groups in Molecule This invention uses as a cross-linking monomer which possesses at least two polymerizable unsaturated groups in the molecular unit thereof. The cross-linking monomer which can be used in this invention, similarly to the polymerizable monomer mentioned above, does not need to be particularly discriminated but is only required to be capable of forming cells in the water-in-oil type high internal phase emulsion.

As concrete examples of the cross-linking monomer which is effectively usable herein, aromatic monomers such as divinyl benzene, trivinyl benzene, divinyl toluene, divinyl xylene, divinyl naphthalene, divinyl alkyl benzenes, divinyl phenanthrene, divinyl biphenyl, divinyl diphenyl methane, divinyl benzyl, divinyl phenyl ether, and divinyl diphenyl sulfide; oxygen-containing monomers such as divinyl furan; sulfur-containing monomers such as divinyl sulfide and divinyl sulfone; aliphatic monomers such as butadiene, isoprene, and pentadiene; and esters of polyhydric alcohols with acrylic acid or methacrylic acid such as ethylene glycol di(meth)acrylate, diethylene glycol di(meth)acrylate, triethylene glycol di(meth)acrylate, polyethylene glycol di(meth)acrylate, 1,3-butane diol di(meth)acrylate, 1,4-butane diol di(meth)acrylate, 1,6-hexane diol di(meth)acrylate, octane diol di(meth)acrylate, decane diol di(meth)acrylate, trimethylol propane di(meth)acrylate, trimethylol propane tri (meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri (meth)acrylate, dipentaerythritol tetra(meth)acrylate, N,N'-methylene bis (meth)acryl amide, triallyl isocyanurate, triallyl amine, tetrallyloxy ethane, hydroquinone, catechol, resorcinol, and sorbitol may be cited. These cross-linking monomers may be used either singly or in the form of a combination of two or more members.

Properly, the cross-linking monomer accounts for a proportion in the range of 0.1–50 wt. %, preferably 1–40 wt. %, and particularly preferably 5–30 wt. %, in the monomer component. If the proportion is less than 0.1 wt. %, the produced porous material will be deficient in strength and force of elastic recovery and will possibly fail to secure fully satisfactory amount of absorption and speed of absorption. Conversely, if the ratio of the cross-linking monomer exceeds 50 wt. %, the porous material will possibly grow in brittleness and suffer from insufficiency of ratio of cubical expansion due to absorption.

(c) Polymerization Initiator

The polymerization initiator which can be used for the reversed-phase emulsion polymerization contemplated by this invention does not need to be discriminated between water-solubility and oil-solubility. As concrete examples of the polymerization initiator which is used effectively herein, azo compounds such as 2,2'-azobis(2-amidinopropane) dihydrochloride; persulfates such as ammonium persulfate, potassium persulfate, and sodium persulfate; peroxides such as hydrogen peroxide, sodium peracetate, sodium percarbonate, benzoyl peroxide, cumene hydroperoxide, t-butyl hydroperoxide, di-t-butyl peroxide, diisopropyl benzene hydroperoxide, p-methane hydroperoxide, 1,1,3,3-tetramethylbutyl hydroperoxide, 2,5-dimethylhexane-2,5-dihydroperoxide, benzoyl peroxide, and methylethyl ketone peroxide; and redox initiators formed by combining the peroxides mentioned above with such reducing agents as sodium hydrogensulfite, sodium thiosulfate, L-ascorbic acid, iron II oxide salts, formaldehyde, sodium sulfoxylate, glucose, dextrose, and dimethyl aniline may be cited. These polymerization initiators may be used either singly or in the form of a combination of two or more members.

Properly, the proportion of the polymerization initiator is in the range of 0.05–15 wt. %, preferably 1.0–10 wt. %, based on the amount of the monomer component, though depending on the combination of a monomer and a polymerization initiator. If the amount of the polymerization initiator to be used is less than minimum proportion of 0.05 wt. %, the shortage will be at a disadvantage in unduly increasing the unaltered monomer and consequently increasing the amount of the residual monomer in the produced porous material. Conversely, if the amount of the polymerization initiator to be used exceeds the maximum proportion of 15 wt. %, the excess will be at a disadvantage in rendering control of the polymerization difficult and deteriorating the mechanical properties of the produced porous material.

(d) Emulsifier

The emulsifier to be used in the method of this invention according to the HIPE method does not need to be particularly discriminated but is only required to be capable of emulsifying a water phase in an oil phase. As concrete examples of the emulsifier usable effectively herein, nonionic surfactants, cationic surfactants, and amphoteric surfactants may be cited.

As concrete examples of the nonionic surfactant, nonylphenol polyethylene oxide adduct; block polymer of ethylene oxide and propylene oxide; sorbitan fatty acid esters such as sorbitan monolaurate, sorbitan monomyristylate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, and self-emulsifying glycerol monostearate; polyoxyethylene alkyl ethers such as polyoxyethylene lauryl ether, polyoxyethylene cetyl ether, polyoxyethylene stearyl ether, polyoxyethylene oleyl ether, and polyoxyethylene higher alcohol ethers; polyoxyethylene alkylaryl ethers such as poloxyethylene nonylphenyl ether; polyoxyethylene sorbitane fatty acid esters such as polyoxyethylene sorbitan monolaurate, polyoxyethylene sorbitan monomyristate, polyoxyethylene soribtan monopalmitate, polyoxyethylene sorbitan monostearate, polyoxyethylene sorbitan tristearate, polyoxyethylene sorbitan monooleate, and polyoxyethylene sorbitan trioleate; polyoxyethylene sorbitol fatty acid esters such as tetraoleic acid polyoxyethylene sorbit; polyoxyethylene fatty acid esters such as polyethylene glycol monolaurate, polyethylene glycol monostearate, polyethylene glycol distearate, and polyethylene glycol monooleate; polyoxyethylene alkyl amines; hydrogenated polyoxyethylene castor oil; and alkyl alkanol amides may be cited. These nonionic surfactants having HLB values of not more than 10 prove preferable. These nonionic surfactants may be used in the form of a combination of two or more members. The combined use of such nonionic surfactants permits stabilization of the water-in-oil type high internal phase dispersion.

As concrete examples of the cationic surfactant, quaternary ammonium salts such as stearyl trimethyl ammonium chloride, ditallowdimethyl ammonium methyl sulfate, cetyl trimethyl ammonium chloride, distearyl dimethyl ammonium chloride, and alkylbenzyl dimethyl ammonium chloride; alkyl amine salts such as coconut amine acetate and stearyl amine acetate; alkl betaines such as lauryl trimethyl ammonium chloride, lauryl betaine, stearyl betaine, and lauryl carboxymethyl hydroxyethyl imidazolinium betaine; and amine oxides such as lauryl dimethyl amine oxide may be cited. The use of a cationic surfactant results in imparting an antibacterial property to the produced absorbent resin.

The combined use of a nonionic surfactant and a cationic surfactant possibly improves the water-in-oil type high internal phase emulsion in stability.

Properly, the amount of the emulsifier to be used is in the range of 1–30 wt. %, preferably 3–15 wt. %, based on the amount of the monomer component.

(e) Salts

The method of this invention, when necessary for enabling the HIPE method to improve the water-in-oil type high internal phase emulsion in stability, may use a water-soluble salt selected from the group consisting of halogenides, sulfates, and nitrates of alkali metals and alkaline earth metals such as calcium chloride, sodium sulfate, sodium chloride, and magnesium sulfate. Properly, the amount of such a salt to be used is not more than 20 wt. %, preferably in the range of 0.5–10 wt. %.

(f) Wetting Agent

Though the porous material of this invention is not discriminated on account of form, it may be finished in a compressed state. The compressed porous material permits a decrease in the space required for transportation and storage. The porous material in the compressed state (referred to otherwise as "compressed porous material") is preferred to contain water in an amount proper for the purpose of retaining the compressed state throughout the period of transportation and storage. A wetting agent may be used for the purpose of enabling the water content in the porous material to be retained in a proper range.

As the wetting agent, it is proper to use any of the water-soluble salts such as calciumchloride, sodium sulfate, sodium chloride, magnesium chloride, and magnesium sulfate which are formed between alkali metals or alkaline earth metals and hydrochloric acid, sulfuric acid, or nitric acid. Incidentally, such a water-soluble salt has been demonstrated to be effective in improving the water-in-oil type high internal phase emulsion instability. Preferably, therefore, the wetting agent is added to the water-in-oil type high internal phase emulsion prior to the start of the operation of the HIPE method. Properly, the amount of the wetting agent to be used as added to the water phase is in the range of 0.1–20 wt. %, preferably 0.5–10 wt. %, and particularly preferably 1–5 wt. %. The wetting treatment of the compressed porous material may be carried out by impregnating the porous material with an aqueous solution or dispersion of the compound mentioned above and then compressing and dehydrating the porous material. Properly in this case, the amount of the wetting agent to be used as added to the water phase is in the range of 0.1–20 wt. %, preferably 0.5–10 wt. %, and particularly preferably 1–5 wt. %.

As the wetting agent, well-known anionic, nonionic, and cationic surfactants and macromolecular surfactants are also effective. When the surfactant which is used as the emulsifier for the water-in-oil type high internal phase emulsion also functions as the wetting agent, the use of the wetting agent other than the emulsifier may be omitted.

(g) Adjustment of pH

This invention has a step of formation of the water-in-oil type high internal phase emulsion as an inevitably step for the production of porous materials. The question as to whether or not the waste water is reused for the formation of the water-in-oil type high internal phase emulsion is irrelevant. Properly, the pH of the reaction solution obtained at the end of the cross-linking polymerization of the water-in-oil type high internal phase emulsion is in the range of 4–9, preferably 5–8. The ratio of reuse of the waste water can be improved by adjusting in a specific range the pH of the waste water obtained by the process of production as mentioned above. Further, the adjustment of the pH in the range mentioned above proves advantageous in respect of lowering the stimulating property of the produced porous material and consequently annulling the influence of the acidic component contained in the produced porous material. Heretofore, the process for the production of the porous material, when necessary for removing this acidic component, has possibly included a step of washing the porous material (fourth step). By adjusting in the range mentioned above the pH of the reaction solution at the end of the cross-linking polymerization of the water-in-oil type high internal phase emulsion, however, it is made possible to abolish the influence of the acidic component and obviate the necessity for the step of washing.

The adjustment of the pH at this stage can be attained by feeding a basic substance or a buffer solution or a solution thereof in the form of spray to the porous cross-linked polymer or by immersing the polymer in the solution. In consideration of the convenience of the operation, the adjustment of the pH is preferred to be carried out prior to the cross-linking polymerization of the emulsion. As the basic substance or the buffer solution to be effectively used herein, any of the compounds enumerated in the paragraph (b) describing the method for adjustment of pH.

(h) Method of Polymerization

The method for producing the water-in-oil type high internal phase emulsion according to this invention will be specifically described below.

For a start, an oil phase composed of a polymerizable monomer, an emulsifier, and a polymerization initiator is stirred at a prescribed temperature to prepare a homogeneous oil phase.

Meanwhile, a water phase solution is prepared by stirring water with a polymerization initiator and, when necessary, further with a salt (hereinafter referred to simply as "water phase") and is then heated to a prescribed temperature in the range of 30–95° C. As the water for the water phase, the waste water obtained in consequence of the production of the porous material may be used directly in its unmodified form or after undergoing a prescribed treatment with the object of promoting the utilization of the waste water as aimed at by this invention. By mixing the water phase and the oil phase efficiently thereby exerting moderate shear force thereon, it is made possible to prepare stably the water-in-oil type high internal phase emulsion.

The well-known stirring devices and mixing devices are available for the purpose of stirring the water phase and the oil phase. As concrete examples of the device used for the stirring, stirring devices provided with vanes shaped like propellers, paddles, and turbine blades, homomixers, line mixers, and pin mills may be cited. Any of these devices may be adopted for an actual stirring operation. Incidentally, the water-in-oil type high internal phase emulsion is generally a white highly viscous emulsion.

The optimum temperature of the water phase and the oil phase is in the range of normal room temperature to 100° C. From the viewpoint of the stability of the water-in-oil type high internal phase emulsion, the temperature is preferred to be in the range of 40–95° C. The two phases are mixed after the temperature of the oil phase and/or the water phase has been adjusted in advance to a prescribed temperature. In the HIPE method, since the water phase is larger in quantity, this adjustment of temperature to the prescribed level is preferred to be performed in the water phase.

The polymerization is performed in the mode of standing polymerization. The material for the device to be used in this polymerization does not need to be particularly discriminated. For example, the devices made of such metals as aluminum, iron, and stainless steel, those made of such synthetic resins as polyethylene, polypropylene, fluorine resin, polyvinyl chloride, and unsaturated polyester resin, and those made of FRP's resulting from reinforcing synthetic resins with fibers such as glass fibers and carbon fibers are available. The polymerization vessel does not need to be particularly discriminated on account of shape. When the polymerization is performed in the mode of standing polymerization, the porous material consequently obtained conforms the interior of the polymerization vessel. When the finished product of the porous material is expected to have a circular shape, an angular shape, or the shape of a sheet, for example, the polymerization vessel is required to have a shape conforming thereto. The porous material may be finished in an arbitrary shape as by polymerizing the porous material in the shape of a block and slicing the block into sheets, for example.

Particularly when the porous material is expected to give a finished product in the shape of a sheet, the porous cross-linked polymer mentioned above is preferred to be in the shape of a sheet. In this case, the porous cross-linked polymer obtained by polymerization in a cylindrical or cubical vessel may be put to use as cut into sheets. When the water-in-oil type high internal phase emulsion is polymerized as cast between two glass sheets opposed to each other across a prescribed gap, a sheet of porous cross-linked polymer having a thickness equaling the gap between the glass sheets can be obtained. Further, the water-in-oil type high internal phase emulsion may be polymerized as supplied onto a belt, a sheet, or a film kept in motion or the emulsion may be polymerized as continuously supplied in a fixed thickness between two opposed belts, sheets, or films. Since the water-in-oil type high internal phase emulsion is subjected to standing polymerization for the purpose of producing the porous material, the produced porous cross-linked polymer is formed in the shape of the polymerization vessel.

The polymerization temperature is in the range of normal room temperature to 100° C. In view of the stability and the polymerization speed of the water-in-oil type high internal phase emulsion, this temperature is preferred to be in the range of 40–95° C. The polymerization time necessary for thorough polymerization is sufficient in the range of several minutes to some tens of hours, on the condition that the polymerization initiator and the polymerization temperature are properly selected. From the standpoint of the productivity, the polymerization is preferred to be completed within ten hours of starting the polymerization.

(i) Treatment of Dehydration and Compression

This invention requires to dehydrate the water phase contained in the porous material after the porous material has been cured by a reaction of polymerization. The method for this dehydration does not need to be particularly discriminated. It may be effected by centrifugation, compression, aspiration by depression, and a varying combination thereof, for example. By compressing the porous cross-linked polymer for the purpose of obtaining a compressed porous material after the porous cross-linked polymer has been cured, therefore, it is made possible to obtain a compressed porous material which has simultaneously undergone dehydration and compression molding. The porous material is caused by the treatment of dehydration to incur a certain decrease in thickness. When the porous material after the treatment of dehydration has a thickness in the specified range, therefore, it is no longer required to undergo a treatment of compression.

When the treatment of compression is performed after the treatment of dehydration or when the treatment of compression concurrently serves as a treatment of dehydration, a method which comprises passing the porous material between opposed rolls or belts separated by a prescribed gap may be adopted. The temperature at which the porous cross-linked polymer is dehydrated at the preceding step and compressed at the present treatment of compression is preferred to be higher than the glass transition point of the porous cross-linked polymer. If the temperature is lower than the glass transition point of the polymer, the insufficient temperature will be at a disadvantage in rupturing the porous texture and changing the pore diameter. The treatment of compression in the method of this invention, from the standpoint of saving the space for transporting and storing the compressed porous material and ensuring ease of handling of this material, proves effective when it decreases the thickness of the material to less than ½, preferably to less than ¼, of the original thickness. Incidentally, this compression may be carried out at any of the third, fourth, and fifth steps mentioned above. Optionally, it may be carried out up to several repetitions.

The ratio of dehydration is generally expected to be as high as permissible. It is found sufficient when the dehydrated porous material has a water content in the range of 1–10 g, preferably 1–5 g, per g of the dried porous material.

Generally, at the step of dehydration mentioned above, 50–98% of the water used undergoes dehydration and the remainder thereof survives as deposited on the porous material. When the porous material is further subjected to such an after-treatment as washing with water for the purpose of improving the surface condition thereof, though the porous material can be deprived of acidic substances and practically detrimental low molecular compounds, it is caused by the dehydration subsequent to the washing with water to give rise to waste water. The water generated in consequence of the dehydration adds wholly to the waste water. This water is wholly returned to the first step or the fourth step and, when falling short of the prescribed level, replenished with newly prepared water, and then put to use in the next cycle of production of a porous material by the HIPE method. The reuse does not always need to cover the whole amount of the waste water.

Besides the washing with water mentioned above, the porous material obtained as described above may be washed with an aqueous solution or a solvent containing any additives. When the porous material is washed with an aqueous hydrating salt solution, this washing brings an effect of improving the porous material in the ability to retain humidity simultaneously with the effect of washing mentioned above.

(j) Other Treatments Like Wetting Treatment

The term "wetting treatment" means the act of adding a wetting agent to the porous material. The wetting is effected by any of the acts of adding the porous material to a solution containing the wetting agent, according to such methods as immersion, spray coating, and roll coating. The wetting treatment is particularly effective in obtaining the porous material as a compressed product. When the porous material has an insufficient water content after the dehydration, the compressed porous material is deprived of the ability to retain the compressed state, partly or wholly inflated to the original thickness and suffered to degrade the quality of the finished product, and prevented from manifesting the superiority in terms of transportation and storage. This invention, so long as a wetting agent is added to the water-in-oil type high internal phase emulsion at the first step, is enabled to manufacture a wetted compressed porous material by dehydrating or compressing the porous cross-linked polymer. When the wetting agent is not added to the water-in-oil type high internal phase emulsion or even when this addition is made, the treatment of wetting can be carried out by causing the compressed porous material obtained at the third step to be washed with a solution containing the wetting agent at the fourth step or the fifth step. When the compressed porous material is washed with a solution containing the wetting agent at the fourth step and the fifth step, this treatment brings an effect of improving the compressed porous material in the ability to retain humidity simultaneously with the effect of washing mentioned above.

For the porous material which has been obtained via the third step or the fourth step and for the porous material which has been obtained via the treatment of wetting, various methods such as drying by heating, drying with hot air, drying under a reduced pressure, drying with an infrared ray, drying with microwave, drying with a drum drier, and drying with hot steam may be adopted. These treatments do not need to be particularly discriminated. They may be put to use as suitably combined. The dried porous material may be moistened so as to adjust the water content.

(5) Porous Material and Product

The porous material which is obtained by the method of this invention does not need to be particularly discriminated by shape. It embraces the compressed porous material which is obtained by further compressing the porous material in a required shape. Particularly the compressed porous material enjoys the convenience during the courses of storage, transportation, and use.

The porous material produced by the method of this invention which is performed as described above can be manufactured into a porous material endowed with functionality by undergoing an operation of impregnation at the step of after-treatment and incorporating therein detergent, aromatic agent, antibacterial agent, deodorant, perfume, varying inorganic powder, foaming agent, pigment, dye, hydrophilic short fiber, plasticizer, tackifier, surfactant, oxidizing agent, reducing agent, and salts or being subjected to a work of impregnating.

Further, the porous material obtained by the method of this invention may be used as cut in shape and size required, though it can be used in the shape as obtained. The cutting may be performed after the step of drying, though not exclusively. The porous cross-linked polymer may be cut prior to the step of dehydration and the products of cutting may be subjected to the step of dehydration. When the step of washing is inserted in the process subsequently to the step of dehydration, the cutting may be carried out at a proper stage as after repeated dehydration which follows the step of washing.

Incidentally, the water-in-oil type high internal phase emulsion is stable even when the waste water is reused as the water phase in the operation of the HIPE method. The porous material consequently obtained, therefore, possesses uniform and fine pores and excels in mechanical properties such as the ability to absorb fluid and the ability to resist pressure. It, therefore, can be used in core materials for disposable diapers and sanitary articles as an absorbent for such excretions as water and urine; in a spent oil treating agent and a spent solvent treating agent as an absorbent for oil and organic solvent; in noise insulators and heat insulators for automobiles and buildings as an energy absorbing material; and in toiletry products impregnated with aromatic agent, detergent, polishing agent, surface protecting agent, and flame retardant as a chemical impregnating basis.

EXPERIMENTS

Now, this invention will be described more specifically below with reference to working examples and controls. It should be noted that the scope of this invention is not limited to these examples.

Example 1

[First round production]

In a cylindrical vessel, an oil phase was prepared by uniformly dissolving a monomer component composed of 3.2 parts by weight of 2-ethylhexyl acrylate and 1.6 parts by weight of 55% divinyl benzene (the remainder p-ethyl-vinyl benzene) together with 0.27 part by weight of sorbitan monooleate added thereto as an emulsifier. Separately, a water phase was prepared by dissolving 12 parts by weight of calcium chloride and 0.125 part by weight of potassium persulfate in 230 parts by weight of purified water and heated to 60° C.

In a cylindrical vessel fitted with a stirrer, the oil phase was stirred at 60° C. and the water phase adjusted in advance to 60° C. was gradually added to the stirred oil phase to obtain a stable water-in-oil type high internal phase emulsion having a W/O ratio of 50/1. Then, the stirrer was removed from the cylindrical vessel. In the cylindrical vessel, the water-in-oil type high internal phase emulsion was kept at 60° C. and left undergoing standing polymerization for 10 hours.

The porous cross-linked polymer consequently obtained was took out from the vessel and then dehydrated by being compressed in the direction of thickness with a water filter. The compression removed about 220 parts by weight of water containing calcium chloride. This water was labeled as "waste water (1)-1." This waste water (1)-1 contained calcium chloride and water in the charging ratio mentioned above and further contained salts identified as a product of decomposition of potassium persulfate in a small amount. The pH thereof was 2.7. A porous material (1)-1 was obtained by drying the dehydrated porous cross-linked polymer with a hot air drier at 60° C. for three hours.

[Second round] (First round of waste water recycle)

In the place of fresh calcium chloride and purified water, 200 parts by weight of the waste water (1)-1 mentioned above was used. A water-in-oil type high internal phase emulsion was again formed with the amounts for use of an oil phase and potassium persulfate decreased to 200/240 because the total amount of purified water and calcium chloride decreased from 240 parts by weight to 200 parts by weight and this emulsion was subjected to the same procedure as described above to obtain waste water (1)-2 and porous material (1)-2.

[Third round] (Second round of waste water recycle)

Waste water (1)-3 (pH=1.9) and porous material (1)-3 were obtained by following the same procedure as described above while using 180 parts by weight of the waste water (1)-2 mentioned above and decreasing the amounts for use of an oil phase solution and potassium persulfate to 180/240.

[Fourth round] (Production again by use of purified water)

Since the water-in-oil type high internal phase emulsion formed by using the waste water (1)-3 showed a trend of generating free water, the fourth round again used purified water and freshly supplied calcium chloride. By using the water up to three repetitions as described above, it was made possible to decrease the amount of the waste water generated per unit amount of the produced porous material to ⅓ and lower the expense for the treatment of waste water and lighten the load on the environment.

Table 1 shows the compression strength and the pore diameter distribution of a varying porous material produced by reusing the waste water and the stability of the water-in-oil type high internal phase emulsion and Table 2 shows the amounts of waste water discharged. The porous materials (1)-1 to (1)-3 consequently obtained manifested fully satisfactory quality as shown in Table 1. The produced porous materials showed surface pH's in the range of 2–3.

Example 2

[First round production]

Waste water (2)-1 and porous material (2)-1 were obtained by repeating the procedure of the first round production of Example 1 while changing the composition of the monomer component to 3.2 parts by weight of 2-ethylhexyl acrylate, 0.7 part by weight of styrene, and 0.9 part by weight of ethylene glycol dimethacrylate.

[Second—fifth rounds] (First—fourth rounds of waste water reuse)

Porous materials were obtained by repeating the procedure of the first round production in Example 2 while using a water phase component obtained by adding calcium hydroxide to the waste water (2)-1 of pH 2.5 thereby adjusting the pH to 6–7. The amounts of monomer component, emulsifier, potassium persulfate, etc. to be used were decreased proportionately to the amounts of waste water to be reused in the same manner as in Example 1 and the ratio of use of the components was equalized with that of the first round. In the third and following rounds, waste waters (2)-2 to (2)-5 and porous materials (2)-2 to (2)-5 were obtained by repeating the same procedure while adjusting the pH's of waste waters in the range of 6–7.

[Sixth round] (Production again with purified water)

Since the waste water (2)-5 showed a sign of the presence of a precipitate in a minute amount and the water-in-oil type high internal phase emulsion produced by using this waste water had a slightly unstable state of emulsification, the waste water was discarded. A porous material was produced with purified water and freshly supplied calcium chloride. By using the water up to five repetitions as described above, it was made possible to decrease the amount of waste water discharged per unit amount of the porous material produced to ⅕ and decrease the expense for the treatment of waste water and lighten the load on the environment.

Table 1 shows the compression strength and the pore diameter distribution of a varying porous material produced by reusing the waste water and the stability of the water-in-oil type high internal phase emulsion and Table 2 shows the amounts of waste water discharged. The porous materials (2)-1 to (2)-5 consequently obtained manifested fully satisfactory quality as shown in Table 1. The produced porous materials showed surface pH's in the range of 4–5.

Example 3

[First round production]

Waste water (3)-1 and porous material (3)-1 were obtained by repeating the procedure of the [first round production] in Example 2.

[Second—tenth round] (First—ninth rounds of waste water recycle)

The same procedure was repeated on a water phase component obtained by adding sodium hydroxide to the waste water (3)-1 of pH 2.5 thereby adjusting the pH to 7.5 and further centrifuging the waste water prior to each round of reuse at 2000 G thereby expelling the precipitate.

The amounts of monomer component, emulsifier, potassium persulfate, etc. were decreased proportionately to the amounts of waste water to be reused and the ratio of the components to be used was equalized with that of the first round. In the third and subsequent rounds, waste waters (3)-2 to (3)-10 and porous materials (3)-2 to (3)-10 were obtained by repeating the same procedure as described above while adjusting the pH's of waste water to 6.5–7.5. Owing to the incorporation of the step of filtration, the reused waste water allowed no accumulation of precipitate, the water-in-oil type high internal phase emulsion suffered no damage to the stability, and the porous material entailed no degradation of quality.

Table 1 shows the compression strength and the pore diameter distribution of a varying porous material produced by reusing waste water and the stability of the water-in-oil type high internal phase emulsion and Table 2 shows the amounts of waste water discharged.

Example 4

[First round production]

Waste water (4)-1 and porous material (4)-1 were obtained by repeating the same procedure as in the first round production of Example 1.

[Second—$50^{th}$ rounds] (First—$49^{th}$ rounds of waste water recycle)

A water phase composed of an oil phase in the same amount as in the [first round production] (4.8 parts by weight of a monomer component and 0.27 part by weight of an emulsifier), 110 parts by weight of the waste water (4)-1, 6 parts by weight of calcium chloride, 115 parts by weight of purified water, and 0.125 part by weight of potassium persulfate was prepared. Specifically, the production equaling in scale with the first round was repeated by reusing a varying waste water (waste water (4)-1 to (4)-49) resulting from dehydration in the previous round production without being refined or adjusted in an amount equal to ½ of the total amount of calcium chloride and purified water necessary for a water phase component and using freshly supplied raw material in an amount equal to the remaining ½ of the total amount mentioned above.

Even when the experiment was performed up to 50 repetitions, the waste water suffered from no accumulation of precipitate, the water-in-oil type high internal phase emulsion entailed no damage to the stability, and the porous material showed no sign of deterioration of quality. Table 1 shows the compression strength and the pore diameter distribution of a varying porous material produced by reusing waste water and the stability of the water-in-oil type high internal phase emulsion and Table 2 shows the amounts of waste water discharged.

Example 5

[First round production]

Waste water (5)-1 and porous material (5)-1 were obtained by repeating the same procedure as in the first round production of Example 1.

[Second—10$^{th}$ round] (First—ninth rounds of waste water recycle)

For the oil phase in the same amount as in the first round production of Example 1 (4.8 parts by weight of a monomer component and 0.27 part by weight of an emulsifier), 216 parts by weight of the waste water (5)-1, 1.2 parts by weight of calcium chloride, 23 parts by weight of purified water, and 0.125 part by weight of potassium persulfate was prepared as a water phase. Specifically, the production equaling in scale with the first round was repeated by reusing a varying waste water (waste water (5)-1 to (5)-9) resulting from dehydration in the previous round production without being refined or adjusted in an amount equal to $9/10$ of the total amount of calcium chloride and purified water necessary for a water phase component and using freshly supplied raw material in an amount equal to the remaining $1/10$ of the total amount mentioned above. When the experiment was carried out up to 10 repetitions, the porous material could be produced and the water-in-oil type high internal phase emulsion showed a trend of lowering homogeneity and suffering liberation of water on the 8$^{th}$–10$^{th}$ round.

Table 1 shows the compression strength and the pore diameter distribution of a varying porous material produced by reusing waste water and the stability of the water-in-oil type high internal phase emulsion and Table 2 shows the amounts of waste water discharged.

Example 6

[First round production]

Waste water (6)-1 and porous material (6)-1 were obtained by repeating the same procedure as in the first round production of Example 1.

[Second—50$^{th}$ rounds] (First—49$^{th}$ rounds of waste water recycle)

For the oil phase in the same amount as in the first round production mentioned above (4.8 parts by weight of a monomer component and 0.27 part by weight of an emulsifier), 216 parts by weight of the waste water (6)-1, 1.2 parts by weight of calcium chloride, 23 parts by weight of purified water, and 0.125 part by weight of potassium persulfate was prepared as a water phase. The waste water had the pH thereof adjusted to about 11. By the use of a a continuous tubular centrifugal separator (produced by Tomoe Kogyo K.K. and sold under the product code of "SMO Type 10 TOMO-E"), the successive rounds were continuously operated under the conditions of 11500 rpm and 32 seconds of retention time to expel a precipitate and the resultant waste water was put to reuse.

The waste water was deprived of the precipitate by a treatment of centrifugal separation and then put to use. In the present example, the experiment of production equal in scale to the first round production was repeated by using a varying waste water (waste water (6)-1 - (6)-49) resulting from dehydration in the previous round production after adjusting the pH to about 11 and removing the precipitate in an amount equal to $9/10$ of the total amount of calcium chloride and purified water necessary for the water phase component and using freshly supplied raw material in an amount equal to the remainder of $1/10$.

Even when the experiment was carried out up to 50 repetitions, the waste water accumulated no precipitate, the water-in-oil type high internal phase emulsion suffered no impairment of stability, and the porous material showed no sign of degradation of quality.

Table 1 shows the compression strength and the pore diameter distribution of a varying porous material produced by reusing waste water and the stability of the water-in-oil type high internal phase emulsion and Table 2 shows the amounts of waste water discharged.

Example 7

Waste waters (7)-1 to (7)-49 and Porous materials (7)-1 to (7)-50 were obtained by following the procedure of Example 6 while using a monomer component composed of 2.5 parts by weight of 2-ethylhexyl acrylate, 0.8 part by weight of styrene, and 1.5 parts by weight of divinyl benzene, adopting a continuous decanter type centrifugal separator (made by Tomoe Kogyo K.K. and sold under the trademark designation of "Sharpless BD Type Decanter P-6600 BD"), operating this device under the conditions of 6100 rpm and 30 seconds of retention time for discarding precipitate form the waste water, and keeping laying pipes from the place of dehydrate and reuse warm in the temperature of 50–55° C.

Even when the experiment was carried out up to 50 repetitions, the waste water accumulated no precipitate, the water-in-oil type high internal phase emulsion suffered no impairment of stability, and the porous material showed no sign of degradation of quality.

Table 1 shows the compression strength and the pore diameter distribution of a varying porous material produced by reusing waste water and the stability of the water-in-oil type high internal phase emulsion and Table 2 shows the amounts of waste water discharged.

Example 8

[First round production]

Waste water (8)-1 and porous material (8)-1 were obtained by repeating the procedure of Example 1 while using the same monomer composition as in Example 7.

[Second—50$^{th}$ rounds] (First—49$^{th}$ rounds of waste water recycle)

For the oil phase of a quantity equal to that of the [first round production] (4.8 parts by weight of a monomer component and 0.27 part by weight of an emulsifier), a water phase was prepared by putting 168 parts by weight of the waste water (8)-1 to reuse without being refined or adjusted, putting 48 parts by weight of the waste water (8)-1 to use after having the pH adjusted to 10–11 and being filtered prior to each reuse, and further adding 1.2 parts by weight of calcium chloride, 23 parts by weight of purified water, and 0.125 part by weight of potassium persulfate. In the present example, the production equal in scale to the first round production was repeated by putting a varying waste water (waste water (8)-1 to (8)-49) resulting from dehydration in the previous round production without being treated in an amount equal to $7/10$ of the total amount of calcium chloride and purified water necessary for the water phase component, using the varying waste water (waste water (8)-1 to (8)-49) resulting from dehydration in the previous round production after having the pH adjusted to 10–11 and removing the precipitate in an amount equal to $2/10$ of the total amount mentioned above, and using freshly supplied raw material in an amount equal to $1/10$ of the total amount.

Even when the experiment was carried out up to 50 repetitions, the waste water accumulated no precipitate, the water-in-oil type high internal phase emulsion suffered no impairment of stability, and the porous material showed no sign of degradation of quality.

Table 1 shows the compression strength and the pore diameter distribution of a varying porous material produced by reusing waste water and the stability of the water-in-oil type high internal phase emulsion and Table 2 shows the amounts of waste water discharged.

Example 9

(A) Reuse of water from third step to first step

Waste waters (9)-1 to (9)-49 and porous material (9)-1 to (9)-50 were obtained by repeating the procedure of Example 6 while using a monomer component composed of 2.5 parts by weight of 2-ethylhexyl acrylate, 0.8 part by weight of styrene, and 1.5 parts by weight of divinyl benzene.

Even when the experiment was carried out up to 50 repetitions, the waste water accumulated no precipitate and the water-in-oil type high internal phase emulsion suffered no impairment of stability.

(B) Reuse of water at fourth step

The porous materials (9)-1 to (9)-50 obtained as described above were each subjected to a treatment of washing with water and repeated dehydration. The washing with water used 50 g of water per g of the polymer component of the porous material. The washed porous material was dehydrated till the water content thereof decreased to about 5 g per g of the polymer component. The waste water resulting from the dehydration and weighing 45 g (per g of the polymer component) was adjusted to pH of about 7, replenished with 5 g of freshly supplied water till 50 g, and used for the washing of the next round. Even when the porous material obtained as described above was used up to 50 repetitions, it showed no sign of degradation of quality.

Table 1 shows the compression strength and the pore diameter distribution of a varying porous material produced by reusing waste water and the stability of the water-in-oil type high internal phase emulsion and Table 2 shows the amounts of waste water discharged.

Example 10

Waste waters (10)-1 to (10)-49 and porous materials (10)-1 to (10)-50 were obtained by following the procedure of Example 7 while combining the waste water emanating from the third step and the waste water emanating from the fourth step, adjusting the combined waste water to pH of 7–8, filtering the resultant waste water, and putting the refined waste water to reuse as the water for the formation of the water-in-oil type high internal phase emulsion at the first step and the washing water at the fourth step.

Even when the experiment was carried out up to 50 repetitions, the waste water accumulated no precipitate, the water-in-oil type high internal phase emulsion suffered no impairment of stability, and the porous material showed no sign of degradation of quality.

Table 1 shows the compression strength and the pore diameter distribution of a varying porous material produced by reusing waste water and the stability of the water-in-oil type high internal phase emulsion and Table 2 shows the amounts of waste water discharged.

(Control 1)

While the first round production of Example 1 discharged 46 parts by weight of waste water per one part by weight of the porous material at the step of dehydration, the production repeated by using freshly supplied raw material in each round without recycling the waste water emitted 46 times as large waste water as the amount of the porous material produced.

(Control 2)

While the first round production of Example 9 discharged 91 parts by weight of waste water per one part by weight of the porous material at the step of dehydration, the production repeated by using freshly supplied raw material in each round without recycling the waste water emitted 91 times as large waste water as the amount of the porous material produced.

TABLE 1

| Example | Porous material | Water phase | Stability of HIPE | Compression strength of porous material (psi) | Pore diameter distribution ($\mu$m) |
|---|---|---|---|---|---|
| Example 1 | (1)-1 | Purified water | o | 1.2 psi | 10~15 |
|  | (1)-2 | Waste water (1)-1 | o | 1.2 psi | 10~15 |
|  | (1)-3 | Waste water (1)-2 | o | 1.1 psi | 13~18 |
| Example 2 | (2)-1 | Purified water | o | 1.0 psi | 10~20 |
|  | (2)-2 | Waste water (2)-1 | o | 1.0 psi | 10~20 |
|  | (2)-3 | Waste water (2)-2 | o | 1.0 psi | 10~20 |
|  | (2)-4 | Waste water (2)-3 | o | 0.95 psi | 15~25 |
|  | (2)-5 | Waste water (2)-4 | o~Δ | 0.9 psi | 15~25 |
| Example 3 | (3)-1 | Purified water | o | 1.0 psi | 10~18 |
|  | (3)-5 | Waste water (3)-4 | o | 1.0 psi | 10~18 |
|  | (3)-10 | Waste water (3)-9 | o | 1.0 psi | 10~18 |
| Example 4 | (4)-1 | Purified water | o | 1.2 psi | 10~15 |
|  | (4)-20 | Waste water (4)-19 | o | 1.2 psi | 10~15 |
|  | (4)-30 | Waste water (4)-29 | o | 1.15 psi | 10~18 |
|  | (4)-50 | Waste water (4)-49 | o | 1.2 psi | 10~15 |
| Example 5 | (5)-1 | Purified water | o | 1.2 psi | 12~17 |
|  | (5)-5 | Waste water (5)-4 | o | 1.2 psi | 12~17 |
|  | (5)-10 | Waste water (5)-9 | o~Δ | 1.0 psi | 15~30 |
| Example 6 | (6)-1 | Purified water | o | 1.2 psi | 10~15 |
|  | (6)-30 | Waste water (6)-29 | o | 1.2 psi | 10~15 |
|  | (6)-50 | Waste water (6)-49 | o | 1.2 psi | 10~15 |
| Example 7 | (7)-1 | Purified water | o | 1.5 psi | 8~12 |
|  | (7)-30 | Waste water (7)-29 | o | 1.5 psi | 10~15 |
|  | (7)-50 | Waste water (7)-49 | o | 1.5 psi | 10~12 |
| Example 8 | (8)-1 | Purified water | o | 1.5 psi | 10~18 |
|  | (8)-30 | Waste water (8)-29 | o | 1.45 psi | 10~18 |

TABLE 1-continued

| Example | Porous material | Water phase | Stability of HIPE | Compression strength of porous material (psi) | Pore diameter distribution ($\mu$m) |
|---|---|---|---|---|---|
| | (8)-50 | Waste water (8)-49 | ○ | 1.45 psi | 12~18 |
| Example 9 | (9)-1 | Purified water | ○ | 1.5 psi | 10~12 |
| | (9)-30 | Waste water (9)-29 | ○ | 1.5 psi | 10~13 |
| | (9)-50 | Waste water (9)-49 | ○ | 1.5 psi | 10~13 |
| Example 10 | (10)-1 | Purified water | ○ | 1.5 psi | 8~12 |
| | (10)-30 | Waste water (10)-29 | ○ | 1.5 psi | 8~13 |
| | (10)-50 | Waste water (10)-49 | ○ | 1.5 psi | 10~13 |

The porous materials were evaluated as follows.

(1) The stability of a water-in-oil type high internal phase emulsion was rated on a three-point scale, wherein ○ stands for a case of forming a stable water-in-oil type high internal phase emulsion showing no separation between an oil phase and a water phase, Δ for a case of forming an emulsion showing separation between an oil phase and a water phase, and X for a case of not forming a water-in-oil type high internal phase emulsion because of separation between an oil phase and a water phase.

(2) The compression strength (psi) of a porous material was determined by the use of an Instron tester at a testing temperature of 20° C.

(3) The pore diameter distribution ($\mu$m) was determined by visual observation of an electron photomicrograph of a porous material. The diameter of pores which occupied not less than 80% of the whole volume of a sample was reported.

TABLE 2

| Example | Amount of waste water discharged (parts by weight/one part by weight porous material) |
|---|---|
| Control 1 | 46 |
| Control 2 | 91 |
| Example 1 | 15 |
| Example 2 | 9 |
| Example 3 | not more than 4.6 |
| Example 4 | not more than 1.0 |
| Example 5 | 4.6 |
| Example 6 | not more than 1.0 |
| Example 7 | not more than 1.0 |
| Example 8 | not more than 1.0 |
| Example 9 | not more than 2.0 |
| Example 10 | not more than 2.0 |

(Results)

(1) Since the waste water generated at the step of dehydrating the porous material was put to reuse, the amount of the waste water to be discharged markedly decreased, the cost of treatment for discharge was decreased, and the load on the environment was lightened as well.

(2) Despite the fact that the waste water was put in the untreated form to reuse, the production of a porous material could be implemented and the produced porous material was fit for the use.

(3) Comparison of Examples 2 and 3 reveals that the number of rounds of reuse could be doubled by subjecting the waste water to the operation of centrifugation in addition to the pH adjustment.

(4) Comparison of Examples 3 and 7 reveals that the number of rounds of reuse could be increased fivefold by replenishing the raw material with fresh feed water in a ratio of 10% in addition to subjecting the waste water to pH adjustment and centrifugation. Comparison of Examples 6 and 7 reveals that this trend was not affected by changing a monomer to be used.

(5) Comparison of Examples 7 and 9 reveals that the reuse could be performed up to not less than 50 repetitions when the treatment of filtration took the place of the centrifugation.

(6) Comparison of Examples 9 and 10 reveals that the reuse could be performed up to not less than 50 repetitions without reference to the choice of the step for putting the waste water to reuse.

Example 11

[First round production]

In a cylindrical vessel, a monomer component consisting of 3.2 parts by weight of 2-ethylhexyl acrylate and 1.6 parts by weight of 55% divinyl benzene (the remainder p-ethylvinyl benzene) and 0.27 part by weight of sorbitan monooleate added thereto as an emulsifier were homogeneously dissolved to prepare an oil phase. Separately, a water phase was prepared by dissolving 2.4 parts by weight of calcium chloride and 0.125 part by weight of potassium persulfate in 237.6 parts by weight of purified water and heated to 60 ° C. The cylindrical vessel was fitted with a stirrer. In this vessel, the oil phase was stirred at 60° C. and the water phase adjusted in advance to 60° C. was gradually added to the stirred oil phase to obtain a stable water-in-oil type high internal phase emulsion having a W/O ratio of 50/1. Then, the stirrer was removed from the cylindrical vessel and the water-in-oil type high internal phase emulsion was kept at 60° C. for 10 hours and left undergoing standing polymerization to obtain a porous material.

Then, the porous cross-linked polymer was cut to obtain a porous cross-linked polymer sheet, 10 mm in thickness. This sheet was dehydrated by being compressed in the direction of thickness between opposed perforated plates. This compression removed about 220 parts by weight of water containing calcium chloride. This water was labeled as "waste water (11)-1a." The waste water (11)-1a was found to contain calcium chloride and water at the charging ratio mentioned above and also contained a salt estimated as the product of decomposition of potassium persulfate in a small amount. The pH of the waste water was about 2.5.

The dehydrated porous cross-linked polymer sheet was washed with 240 parts by weight of purified water and then dehydrated. Consequently, 220 parts by weight of wastewater (11)-1b was obtained. Then, the compressed porous material was immersed in an aqueous 2% calcium chloride solution and subsequently dehydrated to obtain 220 parts by weight of waste water (11)-1c. Then, the content of calcium chloride (wetting agent) in the compressed porous material was adjusted to about 10 wt. %.

The resultant compressed porous material was passed through opposed rolls to decrease the thickness thereof to about 2 mm. It was placed in a hot air drier kept at 60° C. and dried therein till the water content thereof decreased to 0.3 part by weight per one part by weight of the polymer. This was labeled as "compressed porous material (11)-1 ."

[Second round] (First round of waste water reuse)

A water-in-oil type internal phase emulsion was formed again by using 240 parts by weight of the mixture of waste waters (11)-1a (11)-1c mentioned above (hereinafter it was labeled as waste water (11)-1) in the place of newly supplied calcium chloride and purified water. Then, waste waters (11)-2a to (11)-2c and compressed porous materials (11)-2 were obtained by repeating the same procedure. [Third—ninth rounds] (Second—eighth rounds of waste water reuse)

Thereafter, in the same manner as in the second round, a water-in-oil type internal phase emulsion was formed by using 240 parts by weight of the waste water generated in the previous step and waste waters (11)-3 to (11)-9 and compressed porous materials (11)-3 to (11)-9 were obtained by repeating the same procedure.

[Tenth round] (Production again with newly supplied raw material)

When a water-in-oil type internal phase emulsion was formed by using the waste water (11)-9, the emulsion showed a trend of generating free water therein. The tenth round, therefore, again used purified water and freshly supplied calcium chloride.

By using water up to nine repetitions in the manner described above, the amount of water discharged per unit amount of the compressed porous material to be produced could be decreased by about 30%, the cost of treatment of the waste water lowered, and the load on the environment lightened. The produced compressed porous materials (11)-1 to (11)-9 possessed fully satisfactory quality as shown in Table 3.

Table 3 shows the compression strength and the pore diameter distribution of a varying porous material produced by reusing waste water and the stability of the water-in-oil type high internal phase emulsion and Table 4 shows the amounts of waste water discharged.

Example 12

[First round production]

A compressed porous material (12)-1 and waste waters (12)-1a, (12)-1b, and (12)-1c were obtained by repeating the procedure of Example 11 while changing the composition of the monomer component to 0.72 part by weight of styrene, 3.2 parts by weight of 2-ethylhexyl acrylate, and 0.88 part by weight of ethylene glycol dimethacrylate.

[Second round] (First round of waste water reuse)

A water-in-oil type internal phase emulsion was formed with the reuse water obtained by adjusting 240 parts by weight of the mixture of the waste waters (12)-1a to (12)-1c mentioned above (hereinafter it was labeled as waste water (12)-1) to pH of about 8 with sodium hydroxide in the place of freshly supplied calcium chloride and purified water and waste waters (12)-2a to (12)-2c and a compressed porous material (12)-2 were obtained by repeating the same procedure.

[Third—15$^{th}$ rounds] (Second—14$^{th}$ rounds of waste water reuse)

In the same manner as in the second round, a water-in-oil type internal phase emulsion was formed with 240 parts by weight of the waste water generated in the previous step and waste waters (12)-3 to (12)-15 and compressed porous materials (12)-3 to (12)-15 were obtained by repeating the same procedure.

[Sixteenth round] (Production again with freshly supplied raw material)

When a water-in-oil type internal phase emulsion was formed by using the waste water (12)-15, the emulsion showed a trend of generating free water therein. The 16$^{th}$ round, therefore, again used purified water and freshly supplied calcium chloride. By using water up to 15 repetitions in the manner described above, the amount of water discharged per unit amount of the compressed porous material to be produced could be decreased to 1/1.7, the cost of treatment of the waste water lowered, and the load on the environment lightened. The amount could be decreased to about 30%.

Table 3 shows the compression strength and the pore diameter distribution of a varying porous material produced by reusing waste water and the stability of the water-in-oil type high internal phase emulsion and Table 4 shows the amounts of waste water discharged. The produced compressed porous materials (12)-1 to (12)-15 possessed fully satisfactory quality as shown in Table 3.

Example 13

[First found production]

A compressed porous material (13)-1 was obtained and waste waters (13)-1a, (13)-1b, and (13)-1c were also obtained by repeating the same procedure as in Example 12.

[Second round] (First round of waste water reuse)

A water-in-oil type internal phase emulsion was formed with the reuse water obtained by adjusting 240 parts by weight of the mixture of the waste waters (13)-1a to (13)-1c mentioned above to pH of about 8 with sodium hydroxide in the place of freshly supplied calcium chloride and purified water and waste waters (13)-2a to (13)-2c and a compressed porous material (13)-2 were obtained by repeating the same procedure.

[Third—10$^{th}$ rounds] (Second—10$^{th}$ rounds of waste water reuse)

In the same manner as in the second round, a water-in-oil type internal phase emulsion was formed by using 240 parts by weight of the waste water generated in the previous step, with the pH thereof adjusted in advance of use. In the fifth and subsequent rounds, the waste water was filtered prior to use. Waste waters (13)-3 to (13)-10 and compressed porous materials (13)-3 to (13)-10 were obtained by repeating the same procedure as in the first round excepting the alterations mentioned above. The produced compressed porous materials (13)-1 to (13)-10 possessed fully satisfactory quality as shown in Table 3. The water-in-oil type internal phase emulsions formed in the varying rounds showed no discernible change in stability.

By using water up to 20 repetitions in the manner described above, the amount of water discharged per unit amount of the compressed porous material to be produced could be decreased to about 30%, the cost of treatment of the waste water lowered, and the load on the environment lightened. Table 3 shows the compression strength and the pore diameter distribution of a varying porous material produced by reusing waste water and the stability of the water-in-oil type high internal phase emulsion and Table 4 shows the amounts of waste water discharged.

Example 14

[First round production]

In a cylindrical vessel, an oil phase was prepared by homogeneously dissolving a monomer component consisting of 3.2 parts by weight of 2-ethylhexyl acrylate and 1.6 parts by weight of 55% divinyl benzene (the remainder p-ethylvinyl benzene) and 0.27 part by weight of sorbitan monooleate added thereto as an emulsifier. Separately, a water phase was prepared by dissolving 4.8 parts by weight of calcium chloride and 0.125 part by weight of potassium persulfate in 237.6 parts by weight of purified water and heated to 60° C.

In the cylindrical vessel now fitted with a stirrer, the oil phase was stirred at 60° C. and the water phase adjusted in advance to 60° C. was gradually added to the stirred oil phase to obtain a stable water-in-oil type internal phase emulsion having a W/O ratio of 50/1. Then the stirrer was removed from the cylindrical vessel. In the cylindrical vessel, the water-in-oil type internal phase emulsion was kept at 60° C. and left undergoing standing polymerization to obtain a porous cross-linked polymer.

Then, the porous cross-linked polymer was cut to obtain a porous cross-linked polymer sheet, 10 mm in thickness. This sheet is further compressed in the direction of thickness between perforated plates and, at the same time, aspirated under a reduced pressure to effect dehydration. Consequently, about 220 parts by weight of water containing calcium chloride was removed. The water thus removed was labeled as "waste water (14)-1 ." The porous decompressed sheet resulting from the dehydration compression was dried with a hot air drier till the water content of the sheet decreased to 0.3 part by weight per one part by weight of the polymer. The dried porous material was labeled as "compressed porous material (14)-1 ."

[Second round] (First round of waste water reuse)

Waste water (14)-2 and a compressed porous material (14)-2 were obtained by repeating the procedure of the first round while using the waste water (14)-1 mentioned above in an unrefined state in an amount of 120 g equaling ½ of the total necessary amount of calcium chloride and purified water and using newly supplied calcium chloride and purified water in an amount equaling ½ of the total amount in the first round.

[Third—50$^{th}$ rounds] (Second—49$^{th}$ rounds of waste water reuse) Waste waters (14)-3 to (14)-50 and compressed porous materials (14)-3 to (14)-50 were obtained by carrying out the same procedure as in the second round. They possessed fully satisfactory quality as shown in Table 3. The water-in-oil type internal phase emulsions formed in the varying rounds were found to show any discernible change in stability.

By using water up to 50 repetitions in the manner described above, the amount of water discharged per unit amount of the compressed porous material to be produced could be decreased to $\frac{1}{50}$, the cost of treatment of the waste water lowered, and the load on the environment lightened. Table 3 shows the compression strength and the pore diameter distribution of a varying porous material produced by reusing waste water and the stability of the water-in-oil type high internal phase emulsion and Table 4 shows the amounts of waste water discharged.

Example 15

[First round production]

The same water-in-oil type internal phase emulsion as produced in Example 14 was formed and this water-in-oil type internal phase emulsion was cast to capacity in mold frames constructed by opposing two steel plates coated in advance with fluorine resin across an adjusted gap of 5 mm. The mold frames filled with the water-in-oil type internal phase emulsion were placed in a constant temperature bath at 60° C. to cure the emulsion by polymerization for 8 hours and obtain porous cross-linked polymers.

The porous cross-linked polymers were took out from the mold frames and dehydrated by being compressed between perforated plates in the direction of thickness. By this compression, about 220 parts by weight of water containing calcium chloride was removed. This water was labeled as "waste water (15)-1 ." The porous compressed sheets resulting from the dehydration compression were dried in a hot air drier till the water content thereof decreased to 0.4 part by weight per one part by weight of the polymer. The dried sheet was labeled as "compressed porous material (15)-1 ."

[Second round] (First round of waste water reuse)

Waste water (15)-2 and a compressed porous material (15)-2 were obtained by repeating the procedure of the first round while using the waste water (14)-1 mentioned above in an unrefined state in an amount of 216 g, equal to $\frac{9}{10}$ of the total necessary amount of calcium chloride and purified water and using freshly supplied calcium chloride and purified water in an amount equal to $\frac{1}{10}$ of the amount used in the first round.

[Third—10$^{th}$ rounds] (Second—ninth rounds of waste water reuse)

Waste waters (15)-3 to (15)-10 and compressed porous materials (15)-3 to (15)-10 were obtained by performing the same operation as in the second round up to 10 repetitions. As the number of rounds of reuse of the waste water increased, the compressed porous materials began inducing dispersion of pore diameter and showing the trend of forming voids of large diameters. The produced compressed porous materials possessed such quality as shown in Table 3. Table 3 shows the compression strength and the pore diameter distribution of a varying porous material produced by reusing waste water and the stability of the water-in-oil type high internal phase emulsion and Table 4 shows the amounts of waste water discharged.

Example 16

[First round production]

Waste water (16)-1 and a compressed porous material (16)-1 were obtained by repeating the same procedure as in Example 15.

[Second round] (First round of waste water reuse)

Waste water (16)-2 and a compressed porous material (16)-2 were obtained by repeating the procedure of the first round while putting the waste water (14)-1 mentioned above to reuse in an amount of 216 g, equal to $\frac{9}{10}$ of the total necessary amount of calcium chloride and purified water, after being adjusted to pH of about 11 and deprived continuously of the precipitate by the use of a continuous decanter type centrifugal separator (made by Tomoe Kogyo K.K. and sold under the trademark designation of "Sharpless Type Decanter P-660BD") operated under the conditions of 6100 rpm and 30 seconds of retention time and using freshly supplied calcium chloride and purified water in an amount equal to $\frac{1}{10}$ of the total amount mentioned above.

[Third—50$^{th}$ rounds] (Second—49$^{th}$ rounds of waste water reuse)

Waste waters (16)-3 to (16)-50 and compressed porous materials (16)-3 to (16)-50 were obtained by performing the same procedure as in the second round up to 50 repetitions. They possessed fully satisfactory quality as shown in Table 3. The water-in-oil type internal phase emulsions formed in the varying rounds showed no discernible change in stability.

By using water up to 50 repetitions in the manner described above, the amount of water discharged per unit amount of the compressed porous material to be produced could be decreased to $\frac{1}{50}$, the cost of treatment of the waste water lowered, and the load on the environment lightened. Table 3 shows the compression strength and the pore diameter distribution of a varying porous material produced by reusing waste water and the stability of the water-in-oil type high internal phase emulsion and Table 4 shows the amounts of waste water discharged.

Example 17

Waste waters (17)-1 to (17)-50 and compressed porous materials (17)-1 to (17)-50 were obtained by performing the experiment of the first round and the experiments of the second to 50th rounds reusing waste water, both following the same procedure as in Example 16 while changing the composition of the monomer component to 3.2 parts by weight of 2-ethylhexyl acrylate and 1.6 parts by weight of 55% divinyl benzene (the remainder p-ethylvinyl benzene) and changing the amount of calcium chloride to 14.4 parts by weight. They possessed fully satisfactory quality as shown in Table 3. The water-in-oil type internal phase emulsions obtained in the varying rounds showed no discernible change in stability.

By using water up to 50 repetitions in the manner described above, the amount of water discharged per unit amount of the compressed porous material to be produced could be decreased to $\frac{1}{50}$, the cost of treatment of the waste water lowered, and the load on the environment lightened. Table 3 shows the compression strength and the pore diameter distribution of a varying porous material produced by reusing waste water and the stability of the water-in-oil type high internal phase emulsion and Table 4 shows the amounts of waste water discharged.

Example 18

[First round production]

Waste water (18)-1 and a compressed porous material (18)-1 were obtained in the first round production by repeating the same procedure as in Example 16 while changing the composition of the monomer component to 3.2 parts by weight of 2-ethylhexyl acrylate and 1.6 parts by weight of 55% divinyl benzene (the remainder p-ethylvinyl benzene) and changing the amount of calcium chloride to 14.4 parts by weight.

[Second—50th rounds] (First—49th rounds of waste water reuse)

For an oil phase of the same amount as in the [first round production] (4.8 parts by weight of a monomer component and 0.27 part by weight of an emulsifier), a water phase was prepared by reusing 168 parts by weight of the waste water (18)-1 in an unrefined state, using 48 parts of the waste water (18)-1 after having the pH thereof adjusted to 10–11 and undergoing a filtration prior to each reuse, and further adding 1.2 parts by weight of calcium chloride, 23 parts by weight of purified water, and 0.125 part by weight of potassium persulfate. Specifically, the experiment of production equal in scale to the first round production was repeated by reusing a varying waste water (waste water (18)-1 to (18)-49) resulting from dehydration in the previous round production in an untreated state in an amount equal to $\frac{7}{10}$ of the total amount of calcium chloride and purified water necessary for the water phase component, using a varying waste water (waste water (18)-1 to (18)-49) resulting from dehydration in the previous round production after adjustment of pH to 7–8 and filtration in an amount equal to $\frac{2}{10}$ of the total necessary amount mentioned above, and using freshly supplied raw material in an amount equal to $\frac{1}{10}$ of the total necessary amount.

Even when the experiment was performed up to 50 repetitions, the waste water accumulated no precipitate, the water-in-oil type internal phase emulsion suffered no impairment of stability, and the compressed porous material showed no deterioration of quality. Consequently, compressed porous materials (18)-2 to (18)-50 were obtained.

The produced compressed porous materials possessed quality as shown in Table 3. Table 3 shows the compression strength and the pore diameter distribution of a varying porous material produced by reusing waste water and the stability of the water-in-oil type high internal phase emulsion and Table 4 shows the amounts of waste water discharged.

Example 19

In a cylindrical vessel, an oil phase was prepared by homogeneously dissolving a monomer component consisting of 3.2 parts by weight of 2-ethylhexyl acrylate and 1.6 parts by weight of 55% divinyl benzene (the remainder p-ethylvinyl benzene) and 0.27 part by weight of soribtan monooleate added thereto as an emulsifier. Separately, a water phase was prepared by dissolving 4.8 parts by weight of calcium chloride and 0.15 part by weight of ammonium persulfate in 237 parts by weight of purified water and heated to 60° C. The oil phase and the water phase were continuously supplied at a ratio of 50/1 into a stirrer and mixed emulsified therein. A water-in-oil type internal phase emulsion consequently formed was continuously extracted and continuously supplied in a width of about 50 cm and a thickness of about 1 cm onto a belt laid and advanced at a fixed speed. The ribbon of emulsion was passed through a polymerization zone controlled at a temperature in the range of 80–85° C. over a period of about one hour to be polymerized. The ribbon of polymer was subsequently dehydrated compressed with a decompression compression roll and dried with a hot air drier to obtain a compressed porous material (19), about 2 mm in thickness.

Waste water (19) generated by the dehydration was adjusted to pH of about 11 so as to retain the temperature thereof at a level of not less than 50° C. and was continuously deprived of precipitate by using a continuous decanter type centrifugal separator (made by Tomoe Kogyo K.K. and sold under the trademark designation of "Sharpless BD Type Decanter P-660BD") under the conditions of 6100 rpm and 30 seconds of retention time. Specifically, a water phase was prepared by using the waste water refined and warmed as described above in an amount equal to $\frac{9}{10}$ of the whole water phase and using freshly supplied calcium chloride and purified water in an amount equal to $\frac{1}{10}$ of the whole water phase and this water phase was used in the formation of a water-in-oil type internal phase emulsion.

The compressed porous material was continuously produced by reusing the waste water in the manner described above. During the operation continued for about one month, the water-in-oil type internal phase emulsion showed no discernible change in stability and the compressed porous material showed no sign of deterioration of quality as shown in Table 3. Table 3 shows the compression strength and the pore diameter distribution of a varying porous material produced by reusing waste water and the stability of the water-in-oil type high internal phase emulsion and Table 4 shows the amounts of waste water discharged.

Example 20

A compressed porous material (20) were obtained by repeating the same procedure as in Example 19 while changing the reaction temperature of 93° C. instead of 87 ° C., and keeping the waste water warm in the temperature of 80–85 ° C. Table 3 shows the compression strength and the pore diameter distribution of a varying porous material produced by reusing waste water and the stability of the water-in-oil type high internal phase emulsion and Table 4 shows the amounts of waste water discharged.

Example 21

In a cylindrical vessel, an oil phase was prepared by homogeneously dissolving a monomer component consisting of 3.2 parts by weight of 2-ethylhexyl acrylate and 1.6 parts by weight of 55% divinyl benzene (the remaining p-ethylvinyl benzene) and 0.27 part by weight of sorbitan monooleate added thereto as an emulsifier. Separately, a water phase was prepared by dissolving 4.8 parts by weight of calcium chloride and 0.125 part by weight of potassium persulfate in 237.6 parts by weight of purified water and heated to 60° C. In the cylindrical vessel now fitted with a stirrer, the oil phase was stirred at 60° C. and the water phase adjusted in advance to 60 ° C. was gradually added to the stirred oil phase to obtain a water-in-oil type internal phase emulsion having a W/O ratio of 50/1. Then the stirrer was removed from the cylindrical vessel. In the cylindrical vessel, the water-in-oil type internal phase emulsion was kept at 60° C. and left undergoing standing polymerization to obtain a porous cross-linked polymer.

Then, the porous cross-linked polymer was cut to obtain a porous cross-linked sheet, 10 mm in thickness. The sheet was compressed and aspirated under a reduced pressure in the direction of thickness between perforated plates to effect dehydration. The dehydration generated about 220 parts by weight of water containing calcium chloride. This water was labeled as "waste water (21)-1. " The dehydrated compressed porous sheet was dried in a hot air drier till the water content thereof decreased to 0.3 part by weight per one part by weight of the polymer. The dried sheet was labeled as "compressed porous material (21)-1."

[Second round] (First round of waste water reuse)

Waste water (21)-2 and a compressed porous material (21)-2 were obtained by repeating the first round operation which comprised placing in an Erlenmeyer flask the waste water (21)-1 of an amount of 216 g equal to $9/10$ of the total necessary amount of calcium chloride and purified water, then stirring the waste water together with 10.8 g of an anion-exchange resin (made by Mitsubishi Chemical Co., Ltd. and sold under the trademark designation of "DIAION WA2IJ) added thereto for one hour, subsequently separating the ion-exchange resin from the resultant mixture by filtration, adjusting the remaining waste water to pH of about 11, and using freshly supplied calcium chloride and purified water in an amount equal to $1/10$ of the total necessary amount of the first round.

[Third—50$^{th}$ rounds] (Second—4$^{th}$ rounds of waste water reuse)

Waste waters (21)-3 to (21)-50 and compressed porous materials (21)-3 to (21)-50 were obtained by carrying out the same operation as the second round up to 10 repetitions. The produced compressed porous materials (21)-1 to (21)-50 possessed fully satisfactory quality as shown in Table 3. The water-in-oil type high internal phase emulsions in the rounds showed no discernible change in stability. By using water repeatedly in the manner described above, the amount of water discharged per unit amount of the compressed porous material to be produced could be decreased to $1/50$, the cost of treatment of the waste water lowered, and the load on the environment lightened. Table 3 shows the compression strength and the pore diameter distribution of a varying porous material produced by reusing waste water and the stability of the water-in-oil type high internal phase emulsion and Table 4 shows the amounts of waste water discharged.

(Control 3)

The first round production in Example 11 generated 130 parts by weight of waste water per one part by weight of the compressed porous material at the step of dehydration. When the production was repeated by using freshly supplied raw water in each round without using waste water, the waste water discharged was 130 times the amount of the porous material to be produced.

(Control 4)

The first round production in Example 14 generated 43 parts by weight of waste water per one part by weight of the compressed porous material at the step of dehydration. When the production was repeated by using freshly supplied raw water in each round without using waste water, the waste water discharged was 43 times the amount of the porous material to be produced.

The case of repeating the first round production of Example 11 while using freshly supplied raw material in each round without using waste water (reported as "Control 3") and the case of repeating the first round production of Example 14 while using freshly supplied raw material in each round without using waste water (reported as "Control 2") are compared with the working examples of this invention in terms of the amount of waste water discharged in Table 4 below.

TABLE 3

| Example | Porous material | Water phase | Stability of HIPE | Compression strength of porous material (psi) | Pore diameter distribution ($\mu$m) |
|---|---|---|---|---|---|
| Example 11 | (11)-1 | Purified water | ○ | 1.1 psi | 10~15 |
| | (11)-5 | Waste water (11)-4 | ○ | 1.0 psi | 10~20 |
| | (11)-9 | Waste water (11)-8 | Δ | 1.0 psi | 13~25 |
| Example 12 | (12)-1 | Purified water | ○ | 1.0 psi | 10~20 |
| | (12)-8 | Waste water (12)-7 | ○ | 1.0 psi | 10~18 |
| | (12)-15 | Waste water (12)-14 | ○~Δ | 0.9 psi | 15~20 |
| Example 13 | (13)-1 | Purified water | ○ | 1.0 psi | 10~17 |
| | (13)-10 | Waste water (13)-9 | ○ | 1.0 psi | 10~15 |
| | (13)-20 | Waste water (13)-19 | ○ | 1.0 psi | 10~18 |
| Example 14 | (14)-1 | Purified water | ○ | 1.4 psi | 10~15 |
| | (14)-20 | Waste water (14)-19 | ○ | 1.3 psi | 10~15 |
| | (14)-30 | Waste water (14)-29 | ○ | 1.3 psi | 10~18 |
| | (14)-50 | Waste water (14)-49 | ○ | 1.3 psi | 10~15 |
| Example 15 | (15)-1 | Purified water | ○ | 1.2 psi | 12~17 |
| | (15)-5 | Waste water (15)-4 | ○ | 1.2 psi | 12~17 |
| | (15)-10 | Waste water (15)-9 | ○~Δ | 1.0 psi | 15~30 |
| Example 16 | (16)-1 | Purified water | ○ | 1.2 psi | 10~15 |
| | (16)-30 | Waste water (16)-29 | ○ | 1.3 psi | 10~15 |
| | (16)-50 | Waste water (16)-49 | ○ | 1.3 psi | 10~17 |
| Example 17 | (17)-1 | Purified water | ○ | 1.6 psi | 8~12 |

TABLE 3-continued

| Example | Porous material | Water phase | Stability of HIPE | Compression strength of porous material (psi) | Pore diameter distribution (μm) |
|---|---|---|---|---|---|
| | (17)-30 | Waste water (17)-29 | ○ | 1.7 psi | 10~15 |
| | (17)-50 | Waste water (17)-49 | ○ | 1.6 psi | 10~15 |
| Example 18 | (18)-1 | Purified water | ○ | 1.5 psi | 10~18 |
| | (18)-30 | Waste water (18)-29 | ○ | 1.4 psi | 10~22 |
| | (18)-50 | Waste water (18)-49 | ○ | 1.5 psi | 12~23 |
| Example 19 | Initial | Purified water | ○ | 1.3 psi | 10~15 |
| | After 1 M | Waste water (19) | ○ | 1.3 psi | 10~15 |
| Example 20 | Initial | Purified water | ○ | 1.3 psi | 10~15 |
| | After 1 M | Waste water (20) | ○ | 1.2 psi | 10~15 |
| Example 21 | (21)-1 | Purified water | ○ | 1.5 psi | 10~15 |
| | (21)-30 | Waste water (21)-29 | ○ | 1.5 psi | 10~18 |
| | (21)-50 | Waste water (21)-49 | ○ | 1.5 psi | 10~18 |

TABLE 4

| Example and Control | Amount of waste water discharged |
|---|---|
| Control 3 | 130 |
| Example 11 | 91 |
| Example 12 | 89 |
| Example 13 | not more than 88 |
| Control 4 | 43 |
| Example 14 | not more than 1.0 |
| Example 15 | 4.3 |
| Example 16 | not more than 1.0 |
| Example 17 | not more than 1.0 |
| Example 18 | not more than 1.0 |
| Example 19 | not more than 1.0 |
| Example 20 | not more than 1.0 |
| Example 21 | not more than 1.0 |

(Results)

In Examples 11–21 and Controls 3 and 4, since the waste water generated at the step of dehydrating a relevant compressed porous material was reused, the amount of waste water discharged was markedly decreased, the cost of treatment of discharge lowered, and the load on the environment lightened. Even when the waste water was reused in an untreated state, the production of the compressed porous material could be implemented and the produced compressed porous material was fit for the use.

The entire disclosure of Japanese Patent Application No.11-107295 filed on Apr. 14, 1999, and Japanese Patent Application No.11-107296 filed on Apr. 14, 1999 including specification, claims, drawing and summary are incorporated herein by reference in its entirety.

What is claimed is:

1. A method for the production of a porous material by the formation of a water-in-oil type high internal phase emulsion, characterized by causing waste water generated during the process of production to be reused at any of the steps of said process.

2. A method according to claim 1, wherein said waste water is reused for the formation of said water-in-oil type high internal phase emulsion.

3. A method for the production of a porous material, comprising the first step through the third step described below and causing at least part of the waste water obtained at said third step to be reused:

First step: For forming a water-in-oil type high internal phase emulsion having as essential components thereof a monomer component consisting of a polymerizable monomer having one polymerizable unsaturated group in the molecular unit thereof and a cross-linking monomer having at least two polymerizable unsaturated groups in the molecular unit, a surfactant, a polymerization initiator, and water, Second step: For polymerizing said monomer component contained in said water-in-oil type high internal phase emulsion thereby forming a porous cross-linked polymer, and Third step: For compressing or dehydrating said porous cross-linked polymer thereby obtaining waste water and a porous material.

4. A method according to claim 3, which further comprises the fourth step for washing said porous material and then compressing or dehydrating the washed porous material thereby obtaining waste water and the waste water obtained at the third step and/or the fourth step is put to reuse at least partly.

5. A method according to claim 4, wherein said fourth step is followed by the fifth step which constitutes at least one step of treatment selected from among the steps of subjecting said porous material to wetting, drying, cutting, and impregnation with a chemical agent.

6. A method according to claim 3, wherein said waste water is reused at said first step.

7. A method according to claim 1, wherein said waste water is put to reuse after removal of impurities contained in said waste water.

8. A method according to claim 1, wherein waste water is reused after removal of impurities contained in said waste water by centrifugal separation or distillation.

9. A method according to claim 1, wherein waste water is reused after removal of impurities contained in said waste water by continuous operation of a centrifugal separation.

10. A method according to claim 1, wherein said waste water is put to reuse after the pH thereof is adjusted to a level of not less than 7.

11. A method according to claim 1, wherein said waste water is put to reuse after the pH thereof is adjusted to a level in the range of 9–12.

12. A method according to claim 1, wherein the temperature at the time of reuse of said waste water is in the range of 25–100° C.

13. A method according to claim 1, wherein the differences of said waste water in temperature between at the time of obtaining from the process and reusing at any of the steps of said process is not more than 20° C.

14. A method according to claim 3, wherein said water-in-oil type high internal phase emulsion further contains a wetting agent at said first step.

15. A method according to claim 3, wherein said water-in-oil type high internal phase emulsion further contains a water-soluble salt of an alkali metal or an alkaline earth metal with hydrochloric acid, sulfuric acid, or nitric acid as a wetting agent at said first step.

16. A method according to claim 3, wherein the reaction solution after the cross-linking polymerization has the pH thereof adjusted in the range of 4–9 in the production of a porous material at said first step by subjecting said water-in-oil type high internal phase emulsion to cross-linking polymerization.

17. A method according to claim 1, wherein said porous material is in the form of a compressed mass.

18. A method according to claim 4, wherein said waste water is reused at said first step.

19. A method according to claim 5, wherein said waste water is reused at said first step.

20. A method according to claim 3, wherein said waste water is put to reuse after removal of impurities contained in said waste water.

21. A method according to claim 3, wherein waste water is reused after removal of impurities contained in said waste water by centrifugal separation or distillation.

22. A method according to claim 3, wherein waste water is reused after removal of impurities contained in said waste water by continuous operation of a centrifugal separation.

23. A method according to claim 3, wherein said waste water is put to reuse after the pH thereof is adjusted to a level of not less than 7.

24. A method according to claim to claim 3, wherein said waste water is put to reuse after the pH thereof is adjusted to a level in the range of 9–12.

25. A method according to claim 3, wherein the temperature at the time of reuse of said waster water is in the range of 25–100° C.

26. A method according to claim 3, wherein the differences of said waste water in temperature between at the time of obtaining from the process and reusing at any of the steps of said process is not more than 20° C.

27. A method according to claim 3, wherein said porous material is in the form of a compressed mass.

* * * * *